(12) United States Patent
Slota et al.

(10) Patent No.: US 7,877,169 B2
(45) Date of Patent: Jan. 25, 2011

(54) SYSTEM AND METHOD FOR SYNCHRONIZING AN AUXILIARY ELECTRICAL GENERATOR TO AN ELECTRICAL SYSTEM

(75) Inventors: Frederick B. Slota, Lake Ronkonkoma, NY (US); Henry (Ying Hong) Chen, North Bellmore, NY (US)

(73) Assignee: Electro Industries/ Gauge Tech, Westbury, NY (US)

( * ) Notice: Subject to any disclaimer, the term of this patent is extended or adjusted under 35 U.S.C. 154(b) by 679 days.

(21) Appl. No.: 11/894,553

(22) Filed: Aug. 21, 2007

(65) Prior Publication Data

US 2009/0055031 A1 Feb. 26, 2009

(51) Int. Cl.
*G06F 19/00* (2006.01)
(52) U.S. Cl. ........................... 700/286; 702/61
(58) Field of Classification Search ................. 700/286; 702/61; 340/635; 361/65, 42, 47
See application file for complete search history.

(56) References Cited

U.S. PATENT DOCUMENTS

| | | | | |
|---|---|---|---|---|
| 3,491,248 | A * | 1/1970 | Beckwith et al. ............... 307/87 |
| 4,218,625 | A | 8/1980 | Beckwith et al. |
| 4,256,972 | A | 3/1981 | Wyatt et al. |
| 4,310,771 | A | 1/1982 | Wyatt et al. |
| 6,327,541 | B1 * | 12/2001 | Pitchford et al. ............... 702/62 |
| 6,496,342 | B1 | 12/2002 | Horvath et al. |
| 6,654,216 | B2 | 11/2003 | Horvath et al. |
| 6,751,562 | B1 * | 6/2004 | Blackett et al. ................ 702/61 |
| 6,798,190 | B2 * | 9/2004 | Harding et al. .............. 324/142 |
| 7,698,582 | B2 * | 4/2010 | Qin et al. ...................... 713/300 |
| 2006/0235574 | A1 * | 10/2006 | Lapinski et al. ............. 700/286 |

OTHER PUBLICATIONS

Abb AG Power Technology Systems, Plant Electrical Systems, 2005, ABB pp. 1-6.*
BiTronics PowerPlex—Digital Power Transducer; Copyright Areva 2005; Doc. # Automation-L3-PPLEX-BR-10.05-1208-GB; 8 pages.
Bitronics, Inc.; "Applications in the Field . . . Auto-synchronizing", available at www.bitronics.com on Aug. 1, 2007; 2 pages.
Bitronics, Inc.; "Applications in the Field . . . Sync-check Application", available at www.bitronics.com on Aug. 1, 2007; 1 page.
Beckwith Electric Co. Inc.; "Application Guide M-0193B Syncrocloser Unit"; Copyright 1999 Beckwith Electric Co.; Document # 800-0193B-AG-MC2; 25 pages.

* cited by examiner

*Primary Examiner*—Kidest Bahta
(74) *Attorney, Agent, or Firm*—Gerald E. Hespos; Michael J. Porco (57) ABSTRACT

There is provided herein methods and apparatus for apparatus for controlling the interconnection of an auxiliary AC generator with an electrical system, such as an electrical distribution system, e.g., a utility grid. A measuring circuit measures the frequency of an auxiliary AC generator and the phase angle between one voltage phase of the generator and the correspondent voltage phase of the electric utility's electricity supply lines, i.e., the grid, each of which are averaged and filtered. The measured frequency of the auxiliary AC generator is matched to the frequency of the electrical system and the measured phase angle of the generator is matched to the electric utility's electricity supply lines. Once matching is achieved to within a defined tolerance, interconnecting contactors are closed.

12 Claims, 6 Drawing Sheets

SYSTEM AND METHOD FOR SYNCHRONIZING AN AUXILIARY ELECTRICAL GENERATOR TO AN ELECTRICAL SYSTEM

BACKGROUND OF THE INVENTION

1. Field

The present disclosure relates generally to power generation devices. More particularly, the present disclosure relates to a system and method for synchronizing power generation devices to ac electrical power systems.

2. Description of the Related Art

Generally speaking, a power plant uses generators rotated by steam, water, or an engine to produce electrical energy in the form of three-phase alternating current of a fixed voltage and a fixed frequency. Electricity so produced is then delivered to consumers through a network of transformers and transmission lines often referred to as a power distribution grid (i.e., the grid). Within the grid of a single utility company, power generation will often be distributed among several power plants to reduce distribution costs and to improve the reliability of the system. With multiple generators operating, a customer need not lose electrical power simply because a single generator has been taken off-line.

As is well known in the art, a generator is a dynamoelectric machine employing the principles of generator action to produce the electrical output. A generator is a mechanically massive structure and electrically complex, with typical output power ratings up to 1,500 MVA at voltages up to 26 kilovolts (kV). A generator can only be connected to a common electrical bus, or grid, if turning in synchronization with other generators already on the grid. Synchronization requires that the generators are producing alternating current at the same frequency, and that the outputs of the generators are in phase with one another. If both conditions are not met, extremely large electrical currents will flow through the generators, potentially tripping circuit breakers within the network, or even damaging equipment. If a national grid is in place, ideally every generator on the grid, across the entire country, should be turning in synchronization. Presently, to synchronize a generator to a power grid network, expensive dedicated measuring/control equipment is required.

Typically, the synchronization equipment is part of a distributed system including discrete components coupled to the power grid and the generator. This necessitates the use of a high speed communication system for communicating control signals associated with coupling the auxiliary generator to the power grid network once it has been determined that the auxiliary generator has been synchronized. However, such high speed communication systems are prone to many potential failures.

Thus, a need exists for techniques for synchronizing an auxiliary generator to an electrical system, such as an electrical distribution system, e.g., a utility grid in a cost effective manner, without the need for dedicated measuring/control equipment.

SUMMARY OF THE INVENTION

The present disclosure provides a method and apparatus to control the interconnection of an auxiliary AC generator with an electrical system, such as an electrical distribution system, e.g., a utility grid. Broadly, a measuring circuit measures the frequency of an auxiliary AC generator and the phase angle between one voltage phase of the generator and the correspondent voltage phase of the electric utility's electricity supply lines, i.e., the grid, each of which are averaged and filtered. The measured frequency of the auxiliary AC generator is matched to the frequency of the electrical system and the measured phase angle of the generator is matched to the electric utility's electricity supply lines. Once matching is achieved to within a defined tolerance, interconnecting contactors are closed.

According to one aspect, the step of closing the interconnecting contactors may be manual or automatic.

According to one aspect, the present disclosure provides a method for controlling the interconnection of an auxiliary AC generator with an electrical system, such as an electrical distribution system, e.g., a utility grid, the method comprising: determining the frequency of the auxiliary AC generator; computing the phase angle difference between a voltage phase of the auxiliary generator and a corresponding voltage phase of the multi-phase electrical distribution system; adjusting the frequency of the auxiliary generator until it is determined to be substantially equal to the frequency of the electrical distribution system and the phase angle is determined to be within a defined tolerance; and closing a set of interconnecting contactors to connect the auxiliary AC generator to the electrical system.

In accordance with the method, synchronization may be maintained on a continuous basis as opposed to just during startup.

According to one aspect of the present disclosure, the apparatus to control the interconnection of an auxiliary AC generator with an electrical system is incorporated into a power meter.

The above and other aspects, features, and advantages of the present disclosure will become more apparent in light of the following detailed description when taken in conjunction with the accompanying drawings.

BRIEF DESCRIPTION OF THE DRAWINGS

FIG. 3b is a block diagram of an apparatus for controlling the interconnection of an auxiliary generator to an electrical system which includes the IED of FIG. 3a.

DETAILED DESCRIPTION OF THE PREFERRED EMBODIMENTS

Preferred embodiments of the present disclosure will be described herein below with reference to the accompanying drawings. In the following description, well-known functions or constructions are not described in detail to avoid obscuring the present disclosure in unnecessary detail. As used herein, intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. Exemplary intelligent electronic devices are disclosed and described in the following commonly owned U.S. issued patents and published applications: U.S. patent application Ser. No. 10/146,339 entitled "METER WITH IRDA PORT" filed on May 15, 2002; U.S. patent application Ser. No. 10/958,456 entitled "METER HAVING A COMMUNICATION INTERFACE FOR RECEIVING AND INTERFACING WITH A COMMUNICATION DEVICE" filed on Oct. 5, 2004; U.S. patent application Ser. No. 11/087,438 entitled "SYSTEM AND METHOD FOR SIMULTANEOUS COMMUNICATION ON MODBUS AND DNP 3.0 OVER ETHERNET FOR ELECTRONIC POWER METER" filed on Mar. 23, 2005; U.S. patent application Ser. No. 11/109,351 entitled 'SYSTEM AND METHOD FOR COMPENSATING FOR POTENTIAL AND CURRENT TRANSFORMERS IN ENERGY METERS" filed on Apr. 18, 2005; U.S. patent application Ser. No. 11/039,316 entitled "MULTIPLE ETHERNET PORTS ON POWER METER" filed on Jan. 19, 2005; U.S. patent application Ser. No. 11/003,064 entitled "CURRENT INPUTS INTERFACE FOR AN ELECTRICAL DEVICE" filed on Dec. 3, 2004; U.S. patent application Ser. No. 11/042,588 entitled "SYSTEM AND METHOD FOR CONNECTING ELECTRICAL DEVICES USING FIBER OPTIC SERIAL COMMUNICATION" filed on Jan. 24, 2005; U.S. Design Pat. No. D525,893 entitled "ELECTRONIC POWER METER" issued on Aug. 1, 2006; U.S. patent application Ser. No. 11/091,254 entitled "SYSTEM AND METHOD FOR PROVIDING UNIVERSAL ADDITIONAL FUNCTIONALITY FOR POWER METERS" filed on Mar. 28, 2005; U.S. patent application Ser. No. 11/341,802 entitled "METERING DEVICE WITH CONTROL FUNCTIONALITY AND METHOD THEREOF" filed on Jan. 27, 2006; U.S. Design patent application No. 29/224,737 entitled "WALL MOUNT ASSEMBLY" filed on Mar. 7, 2005; U.S. Design Patent No. D526,920 entitled "ELECTRONIC METER" issued on Aug. 22, 2006; Continuation-in-Part U.S. patent application Ser. No. 11/317,227 entitled "TEST PULSES FOR ENABLING REVENUE TESTABLE PANEL METERS" filed on Dec. 22, 2005; U.S. Pat. No. 6,735,535 entitled "POWER METER HAVING AN AUTO-CALIBRATION FEATURE AND DATA ACQUISITION CAPABILITIES" issued on May 11, 2004; U.S. Pat. No. 6,636,030 entitled "REVENUE GRADE METER WITH HIGH-SPEED TRANSIENT DETECTION" issued on Oct. 21, 2002; U.S. Pat. No. 6,751,563 entitled "ELECTRONIC POWER METER" issued on Jun. 15, 2004; U.S. patent application Ser. No. 10/896,489 entitled "SYSTEM AND METHOD UTILIZING VIRTUAL SWITCHING FOR ELECTRIC PANEL METERING" filed on Jul. 22, 2004; U.S. patent application Ser. No. 10/896,521 entitled "ELECTRICAL METER INSTALLATION SYSTEM AND METHOD" filed on Jul. 22, 2004; U.S. patent application Ser. No. 10/969,713 entitled "TEST PULSES FOR ENABLING REVENUE TESTABLE PANEL METERS" filed on Oct. 20, 2004; U.S. patent application Ser. No. 10/969,592 entitled "SYSTEM AND METHOD FOR PROVIDING COMMUNICATION BETWEEN INTELLIGENT ELECTRONIC DEVICES VIA AN OPEN CHANNEL" filed on Oct. 20, 2004; and U.S. patent application Ser. No. 10/969,706 entitled "ON-LINE WEB ACCESSED ENERGY METER" filed on Oct. 20, 2004, the contents of all of which are hereby incorporated by reference in their entireties.

It is to be understood that the present disclosure may be implemented in various forms of hardware, software, firmware, special purpose processors, or a combination thereof. The IED also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 1:
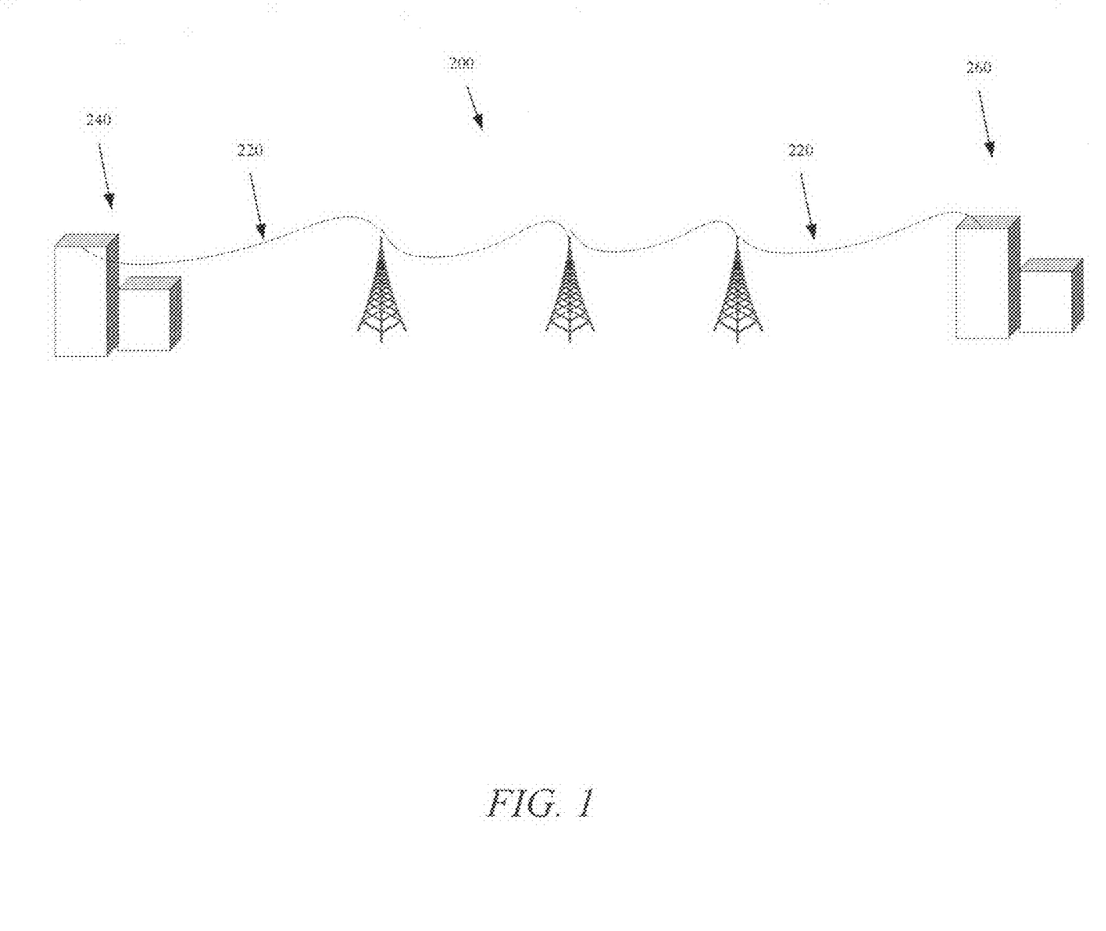
FIG. 1 is a diagram depicting the general environment in which the inventive system and method are used, according to an embodiment of the present disclosure.

Referring now to the drawings, wherein like reference numerals indicate the same parts throughout the several views, the inventive system is shown in its general environment in FIG. 1. Typically, a grid 200 is formed by a network of transmission lines 220. The grid 200 is used to transmit electrical power from generating facilities, i.e. power plants 240 and 260, to customers or end users. For a number of reasons, a grid, whether local, regional, or national, usually includes connections to multiple power plants. As discussed hereinabove, all power plants connected to grid 200 are ideally operating in synchronization and each power plant must be synchronized to grid 200 before being placed on-line. Synchronization requires a generator to produces electricity at precisely the same frequency as the power present on grid 200 and precisely in phase with grid 200.

Figure 2:
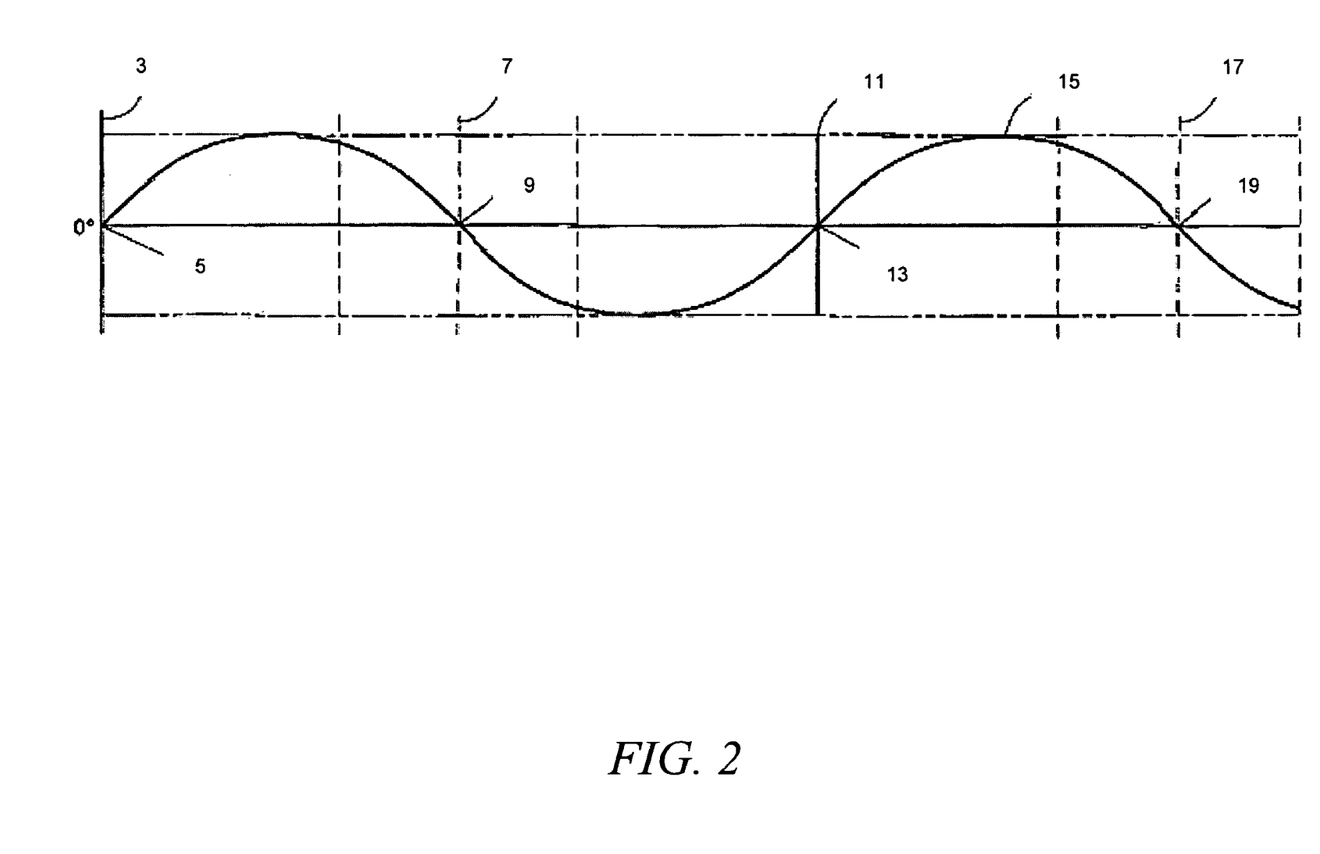
FIG. 2 is a diagram depicting the waveform of a single phase of electrical power as typically produced by a power plant, according to an embodiment of the present disclosure.

Referring next to FIG. 2, typically the electrical power present on a grid, such as grid 20, is in the form of a sine wave 15 of a fixed frequency, for example, 60 Hz in the United States. As will be apparent to those skilled in the art, sine wave 15 undergoes a zero crossing at zero degrees as shown at points 5 and 13 occurring at times 3 and 11, respectively, and at 180 degrees as shown at points 9 and 19 occurring at times 7 and 17, respectively. To be synchronized with the voltage represented by sine wave 15, a generator must produce electrical voltage which also has positive-going zero crossings at times 3 and 11 and negative-going zero crossings at times 7 and 17. It should be understood that the present disclosure is directed to synchronizing the voltage of an auxiliary generator with one of the three phases of the three-phase power produced by power plants. Thus, the sine wave 15 of FIG. 2 could represent any one of the three phases, i.e., phase-A, phase-B, phase C, produced by a power plant. Each phase being delayed by the other by 120 degrees.

Figure 3A:
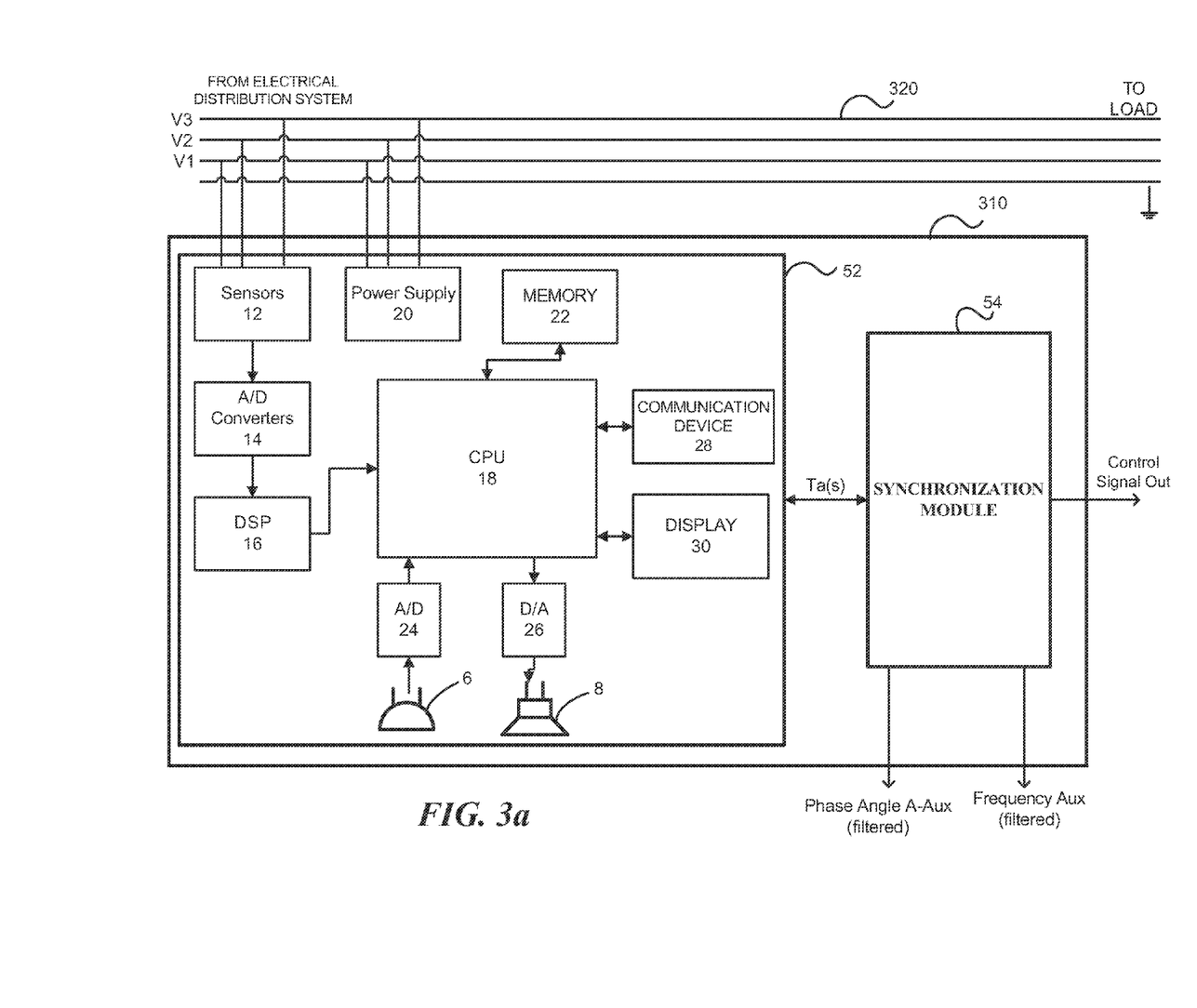
FIG. 3a is an intelligent electronic device (IED) for monitoring and determining an amount of electrical power usage by a consumer.
Figure 3B:
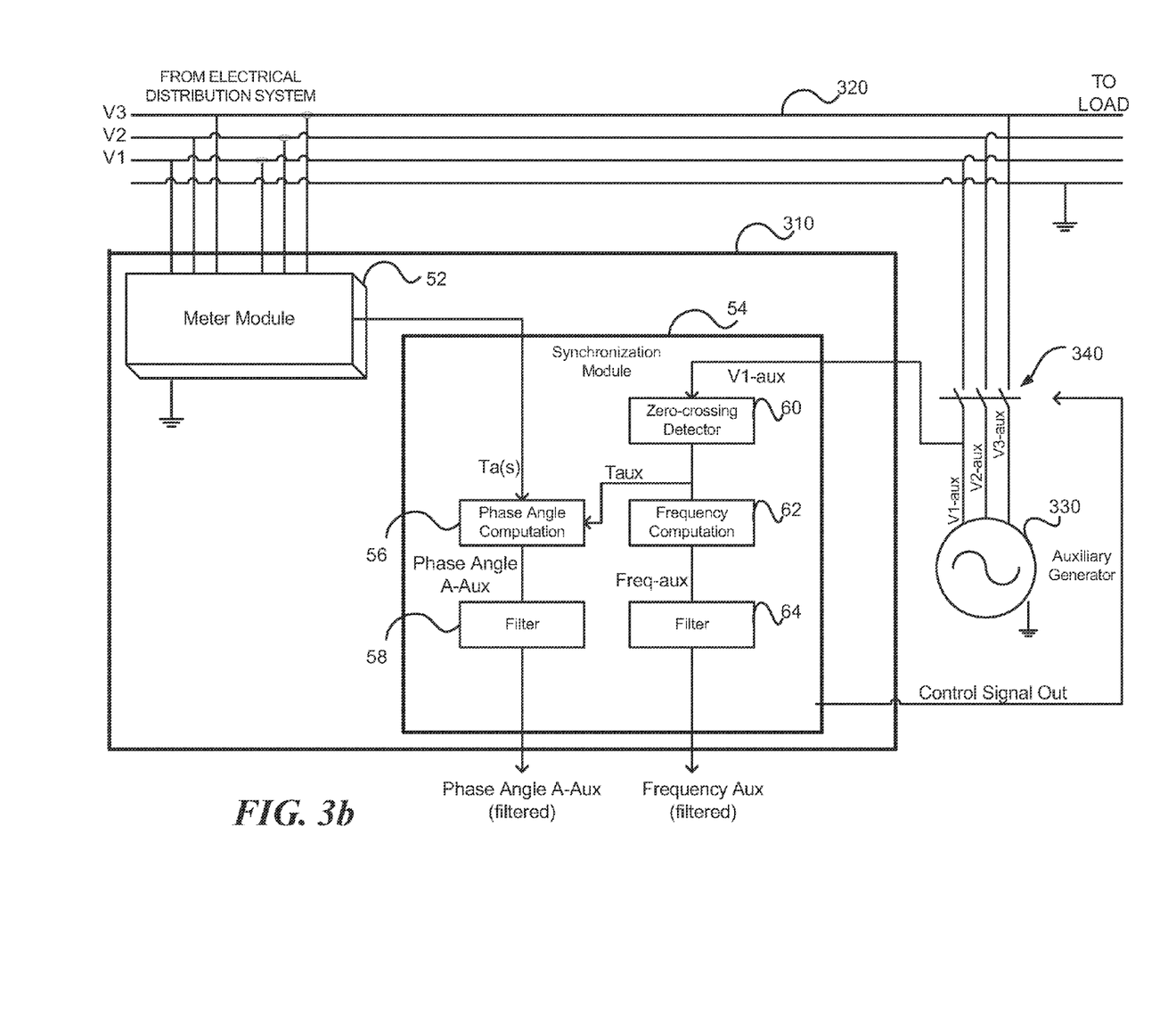

Referring now to FIG. 3a, an apparatus 310 for controlling the interconnection of an auxiliary generator 330 is illustrated. The apparatus includes a meter module 52 coupled to the electrical system 320 for measuring voltages, V1, V2 and V3 associated with the respective three-phase power produced by the power plant 240. The apparatus further includes a synchronization module 54 for controlling the interconnection of an auxiliary generator to the electrical system 320, as will be described below. It should be understood that elements of the synchronization module 54 are not shown in FIG. 3a for clarity. Instead, the elements of the synchronization module 54 are shown in FIG. 3b, and are described further below. The synchronization module 54 is shown coupled to the meter module 52 for receiving a zero-crossing time signal associated with one of the three-phase voltages (V1, or V2, or V3) from the electrical distribution system.

Meter Module 52

The meter module 52 monitors and determines an amount of electrical power usage by a consumer as illustrated in FIG. 1. Generally, the meter module 52 includes sensors 12, a plurality of analog-to-digital (A/D) converters 14 and a processing system including a central processing unit (CPU) 18 and/or a digital signal processor (DSP) 16. The sensors 12 will sense electrical parameters, e.g., voltage and current, of the incoming lines from an electrical power distribution system. Preferably, the sensors will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 18 or DSP 16.

The CPU 18 is configured for receiving the digital signals from the A/D converters 14 to perform the necessary calculations to determine the power usage and controlling the overall operations of the IED 310. In another embodiment, the DSP 16 will receive the digital signals from the A/D converters 14 and perform the necessary calculations to determine the power usage to free the resources of the CPU 18. It is to be appreciated that in certain embodiments the CPU 18 may perform all the functions performed by the CPU 18 and DSP 16, and therefore, in these embodiments the DSP 16 will not be utilized.

A power supply 20 is also provided for providing power to each component of the IED 310. Preferably, the power supply 20 is a transformer with its primary windings coupled to the incoming power distribution lines and having an appropriate number of windings to provide a nominal voltage, e.g., 5VDC, at its secondary windings. In other embodiments, power is supplied from an independent source to the power supply 20, e.g., from a different electrical circuit, a uninterruptible power supply (UPS), etc. In another embodiment, the power supply 20 can also be a switch mode power supply in which the primary AC signal will be converted to a form of DC signal and then switched at high frequency such as but not limited to 100 Khz and then brought through a transformer which will step the primary voltage down to, for example, 5 Volts AC. A rectifier and a regulating circuit would then be used to regulate the voltage and provide a stable DC low voltage output.

The meter module 52 further includes a multimedia user interface for interacting with a user and for communicating events, alarms and instructions to the user. The user interface will include a display 30 for providing visual indications to the user. The display 30 may include a touch screen, a liquid crystal display (LCD), a plurality of LED number segments, individual light bulbs or any combination of these. The display 30 may provide the information to the user in the form of alpha-numeric lines, computer-generated graphics, videos, animations, etc. The user interface will also include a speaker or audible output means 8 for audibly producing instructions, alarms, data, etc. The speaker 8 will be coupled to the CPU 18 via a digital-to-analog converter (D/A) 26 for converting digital audio files stored in a memory 19 to analog signals playable by the speaker 8. An exemplary interface is disclosed and described in commonly owned co-pending U.S. application Ser. No. 11/589,381, entitled "POWER METER HAVING AUDIBLE AND VISUAL INTERFACE", which claims priority to U.S. Provisional Patent Appl. No. 60/731,006, filed Oct. 28, 2005, the contents of which are hereby incorporated by reference in their entireties.

The meter module 52 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v. mpeg2), Microsoft Recorded TV Show files (.dvr-ms), Microsoft Windows Video files (.avi) and Microsoft Windows Audio files (.wav).

In addition to storing audio and/or video files, memory 22 will store the sensed and generated data for further processing and for retrieval when call upon to be displayed at the meter module 52 or from a remote location. The memory 22 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed.

In a further embodiment, the meter module 52 will include a communication device 28 for enabling communications between the meter module and other computing devices, e.g., a desktop computer, laptop computer, other meter modules, etc. The communication device 28 may be a modem, network interface card (NIC), wireless transceiver, etc. The communication device 28 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data.

The meter module 52 may communicate to a server or other computing device via a communication network. The meter module 52 and server may be connected to the communications network, e.g., the Internet, by any known means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any known network that couples a plurality of computers to enable various modes of communication via network messages. Furthermore, the server will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server will further include a storage medium for storing a database of instructional videos, operating manuals, etc., the details of which will be described in detail below.

In an additional embodiment, the meter module 52 will also have the capability of not only digitizing the waveform, but storing the waveform and transferring that data upstream to a central computer, e.g., a remote server, when an event occurs such as a voltage surge or sag or a current short circuit. This data will be triggered on an event, stored to memory, e.g., non-volatile RAM, and additionally transferred to a host computer within the existing communication infrastructure. The digitized waveform will also allow the CPU 18 to compensate other electrical parameters such as harmonics, magnitudes, symmetrical components and phasor analysis. Using the harmonics, the IED 10 will also calculate dangerous heating conditions and can provide harmonic transformer derating based on harmonics found in the current waveform.

In a further embodiment, the meter module 52 will execute an e-mail client and will send e-mails to the utility or to the customer direct on an occasion that a power quality event occurs. This allows utility companies to dispatch crews to repair the condition. The data generated by the meters are use to diagnose the cause of the condition. The data is transferred through the infrastructure created by the electrical power distribution system.

Synchronization Module 54

Referring now to FIG. 3b, there is shown a detailed block diagram of the synchronization module 54 of FIG. 3a. The synchronization module 54 includes a phase-angle computation module 56 for receiving a zero crossing time of a selected voltage phase and a zero crossing time of the auxiliary voltage having a corresponding voltage phase and computes a phase-angle difference as output, a first filter module 58 for filtering the phase-angle difference output from the phase angle computation module 56, a zero-crossing detector 60 for detecting and outputting the zero crossing time of the auxiliary voltage, a frequency computation module 62 for computing a frequency of the auxiliary voltage and a second filter module 64 for filtering the computed frequency output from the frequency computation module 62. The synchronization module 54 is configured to control the interconnection of an auxiliary generator 330 to the electrical distribution system 320.

Figure 4A:
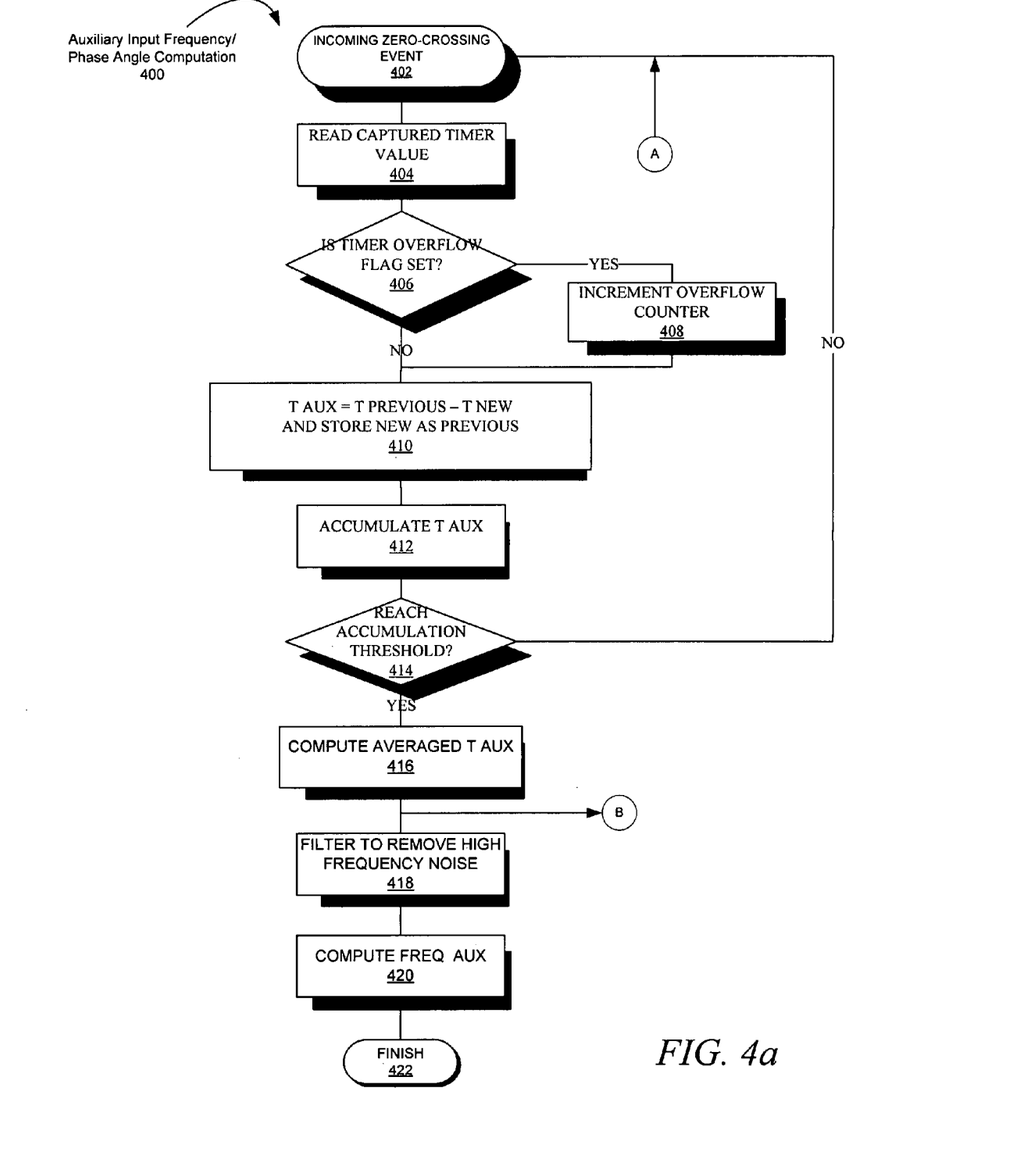
FIGS. 4a & 4b illustrate a process for controlling the interconnection of an auxiliary generator to the electrical system, in accordance with an embodiment of the present disclosure.
Figure 4B:
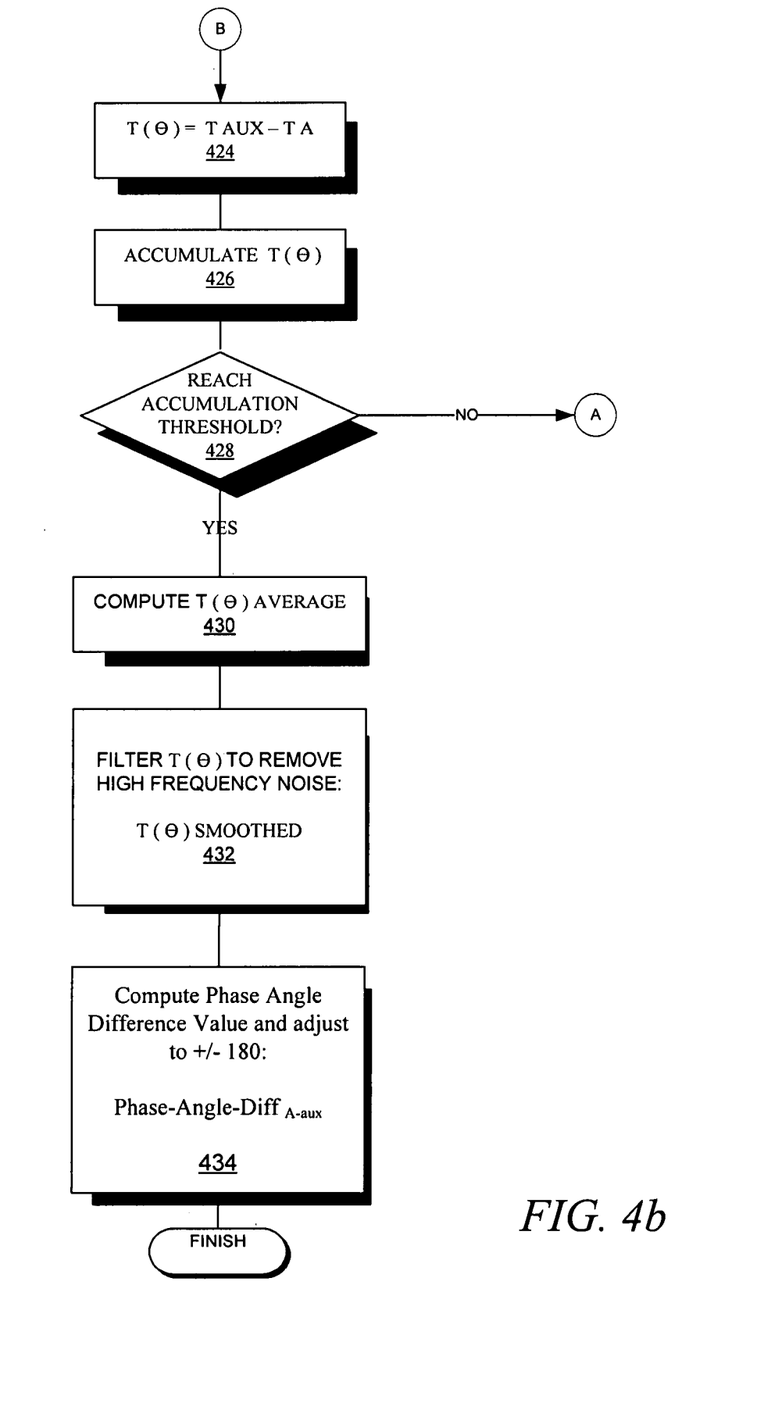

This process is generally described as follows. A more detailed description is provided further below with reference to FIG. 4.

Process Overview

Briefly, an overview of a process for controlling the interconnection of an auxiliary generator 330 to the electrical distribution system 320. is described as follows.

The meter module 52 outputs the zero crossing time, Ta(s) of a voltage, e.g., V1, associated with one phase, e.g., phase-A of the three-phase power. It is understood that any phase may be selected with the only requirement being that the same phase is selected on the auxiliary generator 330. The zero crossing time, Ta(s), of the selected voltage phase is supplied as one input to the phase-angle computation module 56 of synchronization module 54.

The phase angle computation module 56 also receives, as a second input, the zero crossing time T-aux of the voltage V1-aux associated with the corresponding voltage phase, e.g., phase-A, of the auxiliary generator 330, as a second input. This second input, T-aux, is output by the zero-crossing detector 60 of synchronization module 54, which receives V1-aux at its input. V1-aux represents the voltage of phase-A of the auxiliary generator 330. The phase-angle computation module 56 computes a phase angle difference, which is filtered by filtering module 58. The filtering module 58 outputs a filtered phase angle difference value, i.e., Phase-Angle$_{A\text{-}aux}$.

In a substantially parallel process, the frequency of the auxiliary generator 330 is computed by the frequency computation module 62 of synchronization module 54. The frequency computation module 62 receives T-aux as input and computes the frequency of the auxiliary generator 330, Freq-aux, as output.

Knowing the frequency of the auxiliary generator 330, Freq-aux (filtered), as computed below in Eq. [2] and knowing the phase angle difference, Phase-Angle-Diff$_{A\text{-}aux}$(filtered), between phase-A of the reference 320 and phase-A, of the auxiliary generator 330, as computed in Eq. [3] below, an operator may synchronize or to control the interconnection of the auxiliary AC generator 330 with an electrical system 320, i.e., utility grid.

Process Flow

With reference now to FIG. 4, there is shown a process 400 for controlling the interconnection of an auxiliary generator 330 to the electrical system 320, in accordance with an embodiment of the present disclosure. In operation, the metering module 52 detects the rising edge zero-crossing of the reference line voltage V1 in the current cycle (Step-402). The timer value associated with the rising edge zero-crossing event in the current cycle is captured and stored in a memory of the metering module 52 as variable T-NEW (Step-404). A determination is then made regarding whether the timer overflow flag is set (Step-406). The timer overflow flag is set when the timer counting capacity is reached before the next rising edge zero-crossing interrupt occurs. In the case where the timer overflow flag is set, the overflow counter is increased by one (Step-408). The timer counting capacity is 65536 (or 0x0FFFF in Hex). If an overflow (overrun) occurs, a RAM counter is increased by one. In later computation, (current timer reading+65536*value of RAM counter) is used as total timer reading. Next, a zero-crossing difference value, T-AUX, is computed between the zero-crossing event in the present cycle, T-NEW, and the timer value associated with the zero-crossing event in the previous cycle T-PREVIOUS (Step-410).

$$T\text{-}AUX = T\text{-}PREVIOUS - T\text{-}NEW \qquad \text{Eq. [1]}$$

The zero-crossing difference value, T-AUX, is accumulated over consecutive cycles for purposes of smoothing or averaging (Step-412). Next, a determination is made regarding whether an accumulation threshold for T-AUX has been met. The accumulation threshold may be set to a value, for example, of 500 ms. If the accumulation threshold is not reached, the process returns to step 402 (as described above) to detect the rising edge zero-crossing of the reference line voltage V1 in the next waveform cycle (Step-414). Otherwise, the process computes an averaged or smoothed value for T-AUX, yielding T-AUX-AVERAGED (Step-416). The value T-AUX-AVERAGED is filtered to remove any unwanted high-frequency noise, yielding T-AUX-SMOOTHED (Step-418). Then, the frequency of the auxiliary generator 330 is computed by the frequency computation module 62 of the synchronization module 54 as follows (Step-420):

$$\text{Frequency(aux)} = 1/[T\text{-}AUX\text{-}SMOOTHED] \qquad \text{Eq.[2]}$$

Where $$T\text{-}AUX\text{-}SMOOTHED = 1/[T\text{-}AUX\text{-}SMOOTHED(\text{Previous Cycle}) - T\text{-}AUX\text{-}SMOOTHED(\text{Current Cycle})]$$

In addition to computing the frequency of the auxiliary generator 330, in accordance with the principles of the invention, it is also necessary to compute the phase angle difference, Phase-Angle-Diff$_{A\text{-}aux}$, between phase-A of the reference 320 and phase-A, of the auxiliary generator 330. This computation is shown in part 2 of the flowchart of FIG. 4, described as follows. It is first necessary to compute the zero-crossing time difference T (Θ) between the positive zero-crossing time of the reference 320, T-aux SMOOTHED, and T-A, the zero crossing time of phase-A of the reference 320 for one waveform cycle (Step-424). The difference value T (Θ) is accumulated over a number of waveform cycles (Step-426). A determination is made regarding whether the difference value T (Θ) has reached a pre-set accumulation threshold (Step-428). If not, the process returns to step 402 to detect the next incoming zero-crossing event. Otherwise, the process computes an average T (Θ) for a number of waveform cycles corresponding to the threshold (Step-430). The value T (Θ) is filtered to remove any unwanted high-frequency noise, yielding T(Θ) SMOOTHED (Step-432). Finally, the phase angle difference value is computed as: (Step-434)

$$\text{Phase-Angle-Diff}_{A-aux} = T(\Theta)\text{SMOOTHED}/[T\text{-AUX SMOOTHED}*360] \quad \text{Eq. [3]}$$

Where T-AUX SMOOTHED is computed as:

$$T\text{-AUX SMOOTHED} = T\text{-AUX SMOOTHED(Cycle } x) - T\text{-AUX SMOOTHED(Cycle } x+1) \quad \text{Eq. [4]}$$

Synchronization

Knowing the frequency of the auxiliary generator 330, as computed in Eq. [2] and knowing the phase angle difference, Phase-Angle-Diff$_{A-aux}$, between phase-A of the reference 320 and phase-A, of the auxiliary generator 330, as computed in Eq. [3], an operator may synchronize or control the interconnection of the auxiliary AC generator 330 with an electrical system 320, i.e., utility grid. This process comprises the steps of adjusting the frequency of the auxiliary generator 330 until it is substantially equal to the frequency of the reference 320 and determining that the phase angle difference value, Phase-Angle-Diff$_{A-aux}$, is within a defined tolerance. At that point, the operator may synchronize or control the interconnection of the auxiliary AC generator 330 with the electrical system 320, i.e., utility grid. In another embodiment, it is contemplated to provide the meter module 52 with capabilities for determining when the phase angle difference value, Phase-Angle-Diff$_{A-aux}$, is within a defined tolerance. At that point, the meter module 54 manages the synchronization or control of the interconnection of the auxiliary AC generator 330 with the electrical system 320, i.e., utility grid.

In one embodiment, the apparatus 310 may further include an integrated display for displaying an instantaneous phase, frequency, phase-angle difference values and a visual indication of when the phase angle difference value, Phase-Angle-Diff$_{A-aux}$, is within a defined tolerance, to inform an operator that it is permissible to synchronize or control the interconnection of the auxiliary AC generator 330 with the electrical system 320, i.e., utility grid. In this embodiment, the apparatus 310 may be mounted in close proximity to the generator, or on a control panel of the generator, so an operator can receive confirmation that the generator is ready to be brought online.

In another embodiment, the apparatus 310 may further include a control algorithm for outputting an analog control signal to automatically control the auxiliary AC generator 330 to synchronize the auxiliary AC generator 330 with the electrical system 320, i.e., utility grid at the point in time when the phase angle difference value, Phase-Angle-Diff$_{A-aux}$, is within a defined tolerance. In this embodiment, the apparatus 310 includes a plurality of analog outputs wherein at least one analog out is coupled to the generator and provides a frequency adjust signal to adjust the frequency of the generator. When the control algorithm executing in the at least one processor described above determines the phase angle of the grid and generator are in synch, e.g., within a predetermined tolerance range, a digital output will send a control signal to the interconnecting contactors 340 to couple the generator to the grid. It is to be appreciated that the analog outputs and digital outputs may reside on an external function module coupled to the apparatus 310 over a standard communication bus, e.g., ModBus, DNP, etc. Alternatively, the analog and digital outputs may terminate on the apparatus 310 as output signal terminals which may be coupled to an external device such as a generator controller module. It is contemplated to output the analog and digital outputs from the apparatus, via a standard communication bus, as described above, to a generator controller module which is configured to output one or more control signals to the interconnecting contactors 340 to couple the generator to the grid.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the disclosure has been shown and described with reference to certain preferred embodiments thereof, it will be understood by those skilled in the art that various changes in form and detail may be made therein without departing from the spirit and scope of the disclosure.

What is claimed is:

1. A method for controlling the interconnection of an auxiliary AC generator with an electrical distribution system in an intelligent electronic device for monitoring electrical parameters of the electrical distribution system, the method comprising:
   determining a frequency of the auxiliary AC generator by:
   (a) detecting a rising edge zero-crossing of a reference line voltage of the electrical distribution system in two consecutive waveform cycles;
   (b) determining a time value associated with the detected rising edge zero-crossings in the two consecutive waveform cycles; and
   (c) computing a time difference value between the respective time values associated with the detected rising edge zero-crossings in the two consecutive waveform cycles;
   adjusting the frequency of the auxiliary AC generator until a phase angle difference between the auxiliary AC generator frequency and a frequency of a corresponding phase of the electrical distribution system is determined to be within a defined tolerance; and
   closing a set of interconnecting contactors to connect the auxiliary AC generator to the electrical distribution system when said phase angle difference is determined to be within the defined tolerance.

2. The method according to claim 1, further comprising:
   (d) repeating steps (a)-(c) over a predetermined number of consecutive cycles to yield a single averaged time difference value;
   (e) filtering the averaged time difference value to yield a filtered time difference value; and
   (f) computing the frequency of the auxiliary AC generator as:

frequency(aux)=1/[filtered time difference value].

3. An intelligent electronic device (IED) operative to control the interconnection of an auxiliary AC generator with an electrical distribution system, the IED comprising:
- at least one analog sensing circuit for measuring generator and line frequency of the electrical distribution system;
- at least one A/D converter;
- at least one zero-crossing detector;
- a processor, operatively coupled to the A/D converter, wherein the processor is programmed to measure voltage, current, power and energy parameters and being further programmed to determine a frequency of the auxiliary AC generator and said electrical distribution system, said processor being operatively coupled to said at least one zero-crossing detector, said processor being further programmed to measure a difference in phase angle between the auxiliary AC generator and line voltages associated with said electrical distribution system;
- means for adjusting the frequency of the auxiliary AC generator;
- means for determining when the measured difference in phase angle between the auxiliary AC generator and the line voltages associated with said electrical distribution system is determined to be within a defined tolerance;
- means for closing a set of interconnecting contactors to connect the auxiliary AC generator to said electrical distribution system responsive to said means for determining; and
- integrated display means for displaying instantaneous phase, frequency, and phase-angle difference values.

4. The IED according to claim 3, further comprising a program product operable with the IED for automatically controlling the auxiliary AC generator to synchronize the auxiliary AC generator with said electrical distribution system at a point in time when the phase angle difference value is within the defined tolerance, the program product storing instructions operable with the processor to cause said IED to perform the steps of:
- outputting a first analog control signal to a first input of the auxiliary AC generator to adjust the frequency of the auxiliary AC generator;
- determining when the frequency and phase of the selected voltage phase of the auxiliary AC generator and a corresponding voltage phase of said electrical distribution system are synchronized to within the defined tolerance; and
- outputting a second control signal to interconnect contactors to couple the auxiliary AC generator to said electrical distribution system.

5. An IED for monitoring electrical parameters of an electrical distribution system and for controlling the interconnection of an auxiliary AC generator with the electrical distribution system, the IED comprising:
- a meter module coupled to a three-phase power electrical system for measuring respective voltages, harmonics, voltage sags and surges, associated with each phase of the three-phase power electrical system; and
- a synchronization module for controlling the interconnection of said auxiliary AC generator to the three-phase power electrical system, said synchronization module being coupled to said meter module for receiving parameters associated with a selected phase of the three-phase power electrical system for performing said synchronization, wherein the synchronization module, further comprises:
  - a zero-crossing detector module configured to receive a voltage of said auxiliary AC generator, having a voltage phase which corresponds to said selected phase of the three-phase power electrical system and further configured to output a zero-crossing time of said auxiliary AC generator voltage;
  - a frequency computation module for computing an auxiliary AC generator frequency; and
  - a phase angle computation module for receiving, as a first input, said zero crossing time of a voltage associated with a selected phase of the three-phase power electrical system and for receiving, as a second input, said zero-crossing time of said voltage of said auxiliary AC generator and computing a phase-angle difference value therefrom.

6. The IED according to claim 5, further comprising a counter for calculating generator frequency and power system line frequency.

7. An IED according to claim 5, further comprising:
- display means for displaying an instantaneous phase, frequency, phase-angle difference values and a visual indication of when said phase angle difference value, is within a defined tolerance; and
- means for outputting a control signal to synchronize said auxiliary AC generator with the three-phase power electrical system upon determining that said computed phase angle difference is within said defined tolerance.

8. An IED comprising:
- at least one analog sensing circuit for measuring generator and line frequency of an electrical distribution system;
- at least one A/D converter;
- at least one zero-crossing detector;
- a processor, operatively coupled to the A/D converter, said processor programmed to measure voltage, current, power and energy parameters and being further programmed to determine a frequency of said generator and said electrical distribution system, said processor being operatively coupled to said at least one zero-crossing detector, said processor being further programmed to measure a difference in phase angle between said generator and line voltages associated with said electrical distribution system.

9. An IED of claim 8, wherein the measured phase difference in phase angle is an analog value.

10. An IED of claim 8, wherein the measured phase difference in phase angle is a digital value.

11. An IED of claim 8, further comprising a display for providing a graphical display of said phase angles, said generator frequency and said electrical distribution system frequency.

12. An IED of claim 8, further comprising an Ethernet connection for coupling said IED to an external module.

* * * * *